H. PIEPER.
DRIVING OF RAIL AND LIKE VEHICLES.
APPLICATION FILED DEC. 10, 1910.
1,041,867.
Patented Oct. 22, 1912.
2 SHEETS—SHEET 1.
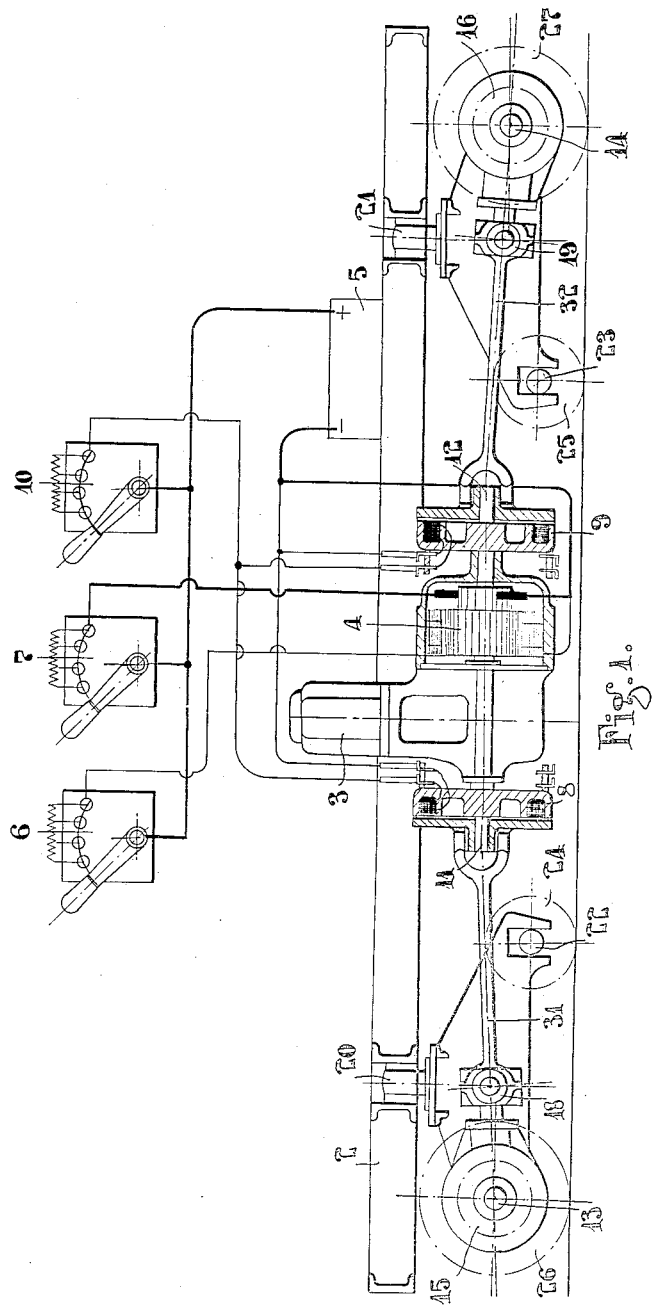

H. PIEPER.
DRIVING OF RAIL AND LIKE VEHICLES.
APPLICATION FILED DEC. 10, 1910.
1,041,867.
Patented Oct. 22, 1912.
2 SHEETS—SHEET 2.
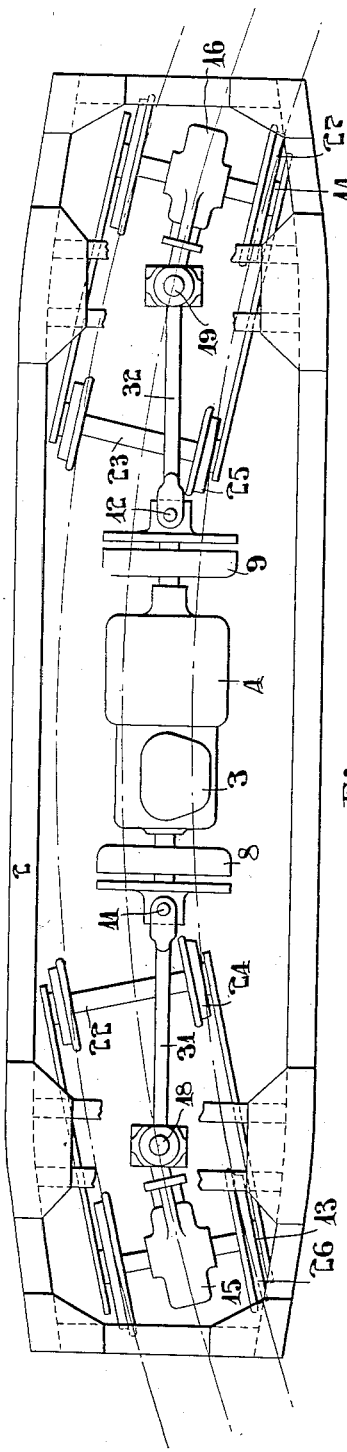
Witnesses:
Wm Bohleber
AS Dunham
H. Pieper,
Inventor,
by Ken. Page, Cooper & Hayward,
Attys.

BEST AVAILABLE COPY

UNITED STATES PATENT OFFICE.

HENRI PIEPER, OF LIEGE, BELGIUM.

DRIVING OF RAIL AND LIKE VEHICLES.

1,041,867.   Specification of Letters Patent.   Patented Oct. 22, 1912.

Application filed December 10, 1910. Serial No. 596,695.

*To all whom it may concern:*

Be it known that I, HENRI PIEPER, a subject of the King of the Belgians, and residing at Liege, Belgium, have invented certain new and useful Improvements in and Relating to the Driving of Rail and Like Vehicles, of which the following is the specification.

This invention relates to the driving of rail and like vehicles, and more particularly to those having a power set comprising a dynamo electric machine adapted to run either as a dynamo or motor mechanically connected with an internal combustion engine and electrically with a buffer battery herein referred to as the system.

It relates more particularly to rail vehicles in which the wheel shafts do not remain parallel while traversing curves, that is to say, it refers more particularly to bogie or like constructions.

The invention has for its object to allow of the use of a power unit placed longitudinally with respect to the vehicle, and having a shaft transmission of such nature that the displacement of the driving wheel shafts, either as the result of traveling upon curves or unevenness of the track, does not affect the efficiency of transmission.

This invention consists in a driving arrangement for a vehicle with bogie carriages having wheels of unequal diameter the wheels of larger diameter being arranged outside to form the greater wheel base so that these wheels can be driven through a transmission shaft which can be substantially horizontal because of the low arrangement of the axles of the other wheels due to their smaller size.

This invention also consists in an arrangement in which the power is transmitted through a Cardan shaft the joint of which is mounted directly below the swiveling point of the bogie.

This invention also consists in a driving arrangement in which the power set is disposed longitudinally of the vehicle and below the main body of the chassis, the drive being transmitted from both ends of the set through Carden shafts to the outer wheels.

This invention further consists in a driving arrangement of the kind referred to above with the provision of electromagnetic clutches between the driving set and the transmission shafts.

This invention also consists in the improvements in and relating to vehicle driving hereinafter indicated.

Figures 1 and 2, respectively, show in elevation and in plan diagrammatically one form of the present invention in which bogies are employed.

Referring to Figs. 1 and 2, upon the chassis 2, and longitudinally with respect thereto, is mounted a driving set comprising an internal combustion engine 3, a dynamo motor 4, and a battery 5, acting together in the well known manner. A controller 6, is provided in the field circuit of the dynamo motor, and a controller 7, is inserted in the armature circuit to effect regulation as desired. The common shaft of the set is provided at each extremity with a magnetic clutch 8, 9, controlled by a controller 10, to effect connection or disconnection as desired with the shafts 31, 32, connected thereto by the flexible couplings 11, 12. The shafts 31, 32, drive the track wheel shafts 13, and 14, by any suitable driving connection, for example, a bevel wheel drive inclosed within a suitable casing 15, 16. At the points 18, 19, which are points vertically below the centers about which the bogie trucks swivel, are provided Cardan joints. The pivots of the bogie trucks are shown at 20, 21. The bogie trucks in this form are provided with unequal wheels, the shafts 22, and 23, bearing the small wheel pairs 24, and 25, respectively, and the shafts 13, and 14, bearing the larger and driven wheel pairs 26, and 27, respectively.

It will be understood that the magnetic clutches shown are not essential, in that any other suitable form of clutch may be employed. Furthermore it is particularly desirable in most instances to arrange the clutch controller so, where magnetic clutches are employed, that the same lever acts simultaneously upon both clutches. This is shown in the form indicated but is, however, not essential.

It will be seen that in the forms indicated in Figs. 1 and 2, the Cardan joints 18, and 19, are so disposed that, notwithstanding swiveling of the bogie during passage of the vehicle over curves, or notwithstanding displacements due to unevenness of the track, the transmission from the power unit to the driving track wheel shafts is unaffected. This arrangement is of particular advantage on tramway tracks where sharp curves are to be encountered. Furthermore a bogie with unequal wheels and driven as indicated in Figs. 1, and 2, is particularly advantageous, a bogie drive of the type known as "maximum traction" being obtained.

Having thus described my invention, what I claim as new and desire to secure by Letters Patent is:—

1. In a rail vehicle, a bogie truck, a power unit disposed longitudinally on aforesaid vehicle, a flexible coupling disposed in the vertical axis of the center of pivoting of aforesaid bogie truck, a connecting element connecting said coupling to aforesaid power unit, a clutch interposed in said connecting element, and a driving connection between the aforesaid flexible coupling and aforesaid track wheel shaft; as set forth.

2. In a rail vehicle, a power unit, a driving shaft extending therefrom, a clutch interposed in said driving shaft, a bogie truck on said vehicle, a driven track wheel shaft mounted in said bogie, track wheels thereon, a further track wheel shaft in said bogie and track wheels thereon of lesser size than aforesaid wheels, a flexible coupling disposed in the vertical axis of the center of pivoting of said bogie truck and connected to aforesaid driving shaft, and a driving connection between the said coupling and former of aforesaid track wheel shafts; as set forth.

3. In a rail vehicle, a power unit disposed longitudinally with respect to aforesaid vehicle driving shafts extending from both ends of said unit clutch elements interposed in said shafts, swiveling elements carrying track wheel shafts, driving elements connecting aforesaid driving shafts to said track wheel shafts, and a flexible coupling interposed in said driving shafts and disposed in the vertical axis of the center of swiveling of aforesaid swiveling elements; as set forth.

4. A driving arrangement for vehicles including in combination a power unit, a bogie carriage including two pairs of wheels of different diameter, a shaft connecting the power unit to the wheels of larger diameter to drive the same, said shaft being disposed at a height above the center of the wheels of smaller diameter and a flexible coupling interposed in said driving shaft and disposed in the vertical axis of the center of said bogie truck; as set forth.

5. A driving arrangement for vehicles including a power unit comprising a dynamo electric machine adapted to run either as a dynamo or as a motor mechanically connected with an internal combustion engine disposed longitudinally on aforesaid vehicle, a bogie truck, a flexible coupling disposed in the vertical axis of the center of pivoting of aforesaid bogie truck, a connecting element connecting said coupling to aforesaid power unit, a clutch interposed in said connecting element, and a driving connection between the aforesaid flexible coupling and aforesaid vehicle wheel shaft; as set forth.

6. A driving arrangement for vehicles including a power unit comprising a dynamo electric machine adapted to run either as a dynamo or as a motor mechanically connected with an internal combustion engine, a bogie carriage including two pairs of wheels of different diameter, a shaft connecting the power unit to the wheels of larger diameter to drive the same, said shaft being disposed at a height above the center of the wheels of smaller diameter and a flexible coupling interposed in said driving shaft and disposed in the vertical axis of the center of said bogie truck; as set forth.

In testimony whereof I have signed my name to this specification in the presence of two subscribing witnesses.

HENRI PIEPER.

Witnesses:
SAM. HEPTIN,
L. BERCK.